United States Patent [19]
Matiere

[11] Patent Number: 4,836,714
[45] Date of Patent: Jun. 6, 1989

[54] ENCLOSED STRUCTURES OF VERY LARGE CROSS-SECTION, SUCH AS CONDUITS, SILOS OR SHELTERS

[76] Inventor: Marcel Matiere, 17 Avenue Aristide Briand, 15000 Aurillac, France

[21] Appl. No.: 58,567

[22] Filed: Jun. 5, 1987

Related U.S. Application Data

[63] Continuation-in-part of Ser. No. 522,169, Jul. 15, 1983, Pat. No. 4,693,635.

[30] Foreign Application Priority Data

| Nov. 17, 1981 [FR] | France | 81 21510 |
| Jun. 11, 1982 [FR] | France | 82 10266 |
| Jun. 6, 1986 [FR] | France | 86 08237 |

[51] Int. Cl.$^4$ .............................................. E21D 9/00
[52] U.S. Cl. ...................................... 405/134; 405/124; 405/153
[58] Field of Search .............. 405/124, 125, 126, 132, 405/134, 135, 146, 147, 149, 150, 151, 152, 153, 154; 52/587; 138/105, 155, 156, 157, 158, 159, 162, 164, 166

[56] References Cited

U.S. PATENT DOCUMENTS

| 109,886 | 12/1870 | Freeman | 405/126 |
| 1,004,288 | 9/1911 | McAlpine | 405/151 |
| 1,474,808 | 11/1923 | Zucco | 405/150 |
| 1,886,707 | 11/1932 | MacPherson | 405/126 X |
| 3,638,434 | 2/1972 | Delaere | 405/126 |
| 3,768,267 | 10/1971 | Chlumecky | 405/152 |

Primary Examiner—David H. Corbin
Attorney, Agent, or Firm—Frost & Jacobs

[57] ABSTRACT

Enclosing structures having tubular sections which are elliptical in cross-section, each section being an assembly of prefabricated components corresponding to a portion of the cross-section of the tubular section and including side components and a vault forming upper component, and optionally a base component, the side components having stabilizing members at their lowermost ends, joints being provided to integrally interconnect the components to form a unitary structure.

31 Claims, 5 Drawing Sheets

ENCLOSED STRUCTURES OF VERY LARGE CROSS-SECTION, SUCH AS CONDUITS, SILOS OR SHELTERS

This is a continuation-in-part of U.S. patent application Ser. No. 522,169, filed July 15, 1983 and entitled Method For Producing Hollow Structures And Hollow Structures, now U.S. Pat. No. 4,693,635.

BACKGROUND OF THE INVENTION

The present invention relates to a hollow, structure of very large cross-section, for example larger than 100 $m^2$, and consisting of tubular sections placed end to end along a lengthwise axis.

Structures of this kind are typically large cross-section conduits, for example larger than the conventional industrial fabrications of about 2 $m^2$, which may or may not be buried, for carrying water or other fluids, pressurized or otherwise, or even for cable ducts, but the invention relates particularly to the production of very large cross-section enclosed structures, even larger than 100 $m^2$, which can be used, for example, for pedestrian or vehicle passageways or for parking. The invention is also applicable to relatively short, covered structures, for use as cellars, silos or bomb shelters or the like.

Furthermore, the invention relates to non-enclosed structures usable, for example, for realizing irrigation canals.

The most commonly used technique comprises the use of tubular sections of circular cross-section, which are assembled end to end of various methods. This technique has drawbacks which increase with the diameter of the conduit, even if the lengths of the sections are shortened, namely: manufacture, transportation, handling and installation. In any event, setting aside the problems of manufacture, problems of sheer size arise once an external diameter of 2.5 m is attained, which corresponds to the normal limit for road transportation. When very large quantities of fluid are to be carried, a plurality of parallel conduits must be provided, which is a costly solution, or the conduit may have to be manufactured at the construction site, using masonry construction techniques or the work may need to be carried out in underground shafts, which is also costly and time-consuming in manufacture or construction.

Furthermore, as is known, conduits of circular section are the most suitable for high internal pressures. A cross-section of this kind is the easiest to produce when sections corresponding to the whole cross-section or contour of the conduit are manufactured. On the other hand, a circular cross-section of this kind has disadvantages for other uses. A conduit of circular cross-section gives rise to stresses in the supporting ground which have a pronounced maximum in the median region. Consequently, if the soil is loose, considerable differential subsidence may occur after the conduit is laid. Circular cross-sections are poorly suited to effective use of restricted space in an urban environment. Lastly, the weight of the conduit is comparatively high; in the case of modular sections covering the entire cross-section or contour, the constituent material is, in fact, uniformly distributed along the entire periphery, whereas the stresses are not thus distributed.

To overcome these various problems, it has been proposed—see, for example, German Pat. No. 2,157,191—to construct conduits having cross-sections which are flattened at their base, by assembling prefabricated longitudinal components on site, each corresponding to a part of the contour or cross-section of the conduit and made of corrugated sheet metal. Such structural components have a low mechanical strength in respect of external forces, so that there is no certainty that the contour and the leakproof sealing will be maintained. Furthermore, the corrugations increase flow resistance.

French Pat. No. 733,098 and U.S. Pat. No. 2,400,071 disclose techniques consisting in assembling a large number of small components, each having a transverse flange for joining onto adjacent components. The large number of components means that they have to have identical configurations, which results in a cross-section of circular contour being adopted, and, in this case, stress resistance requires the junctions to alternate in the lengthwise direction. U.S. Pat. No. 2,400,071 provides for taking into account the stresses exerted on the conduit wall and for using for the upper part of a tunnel components which are of lower strength than those for the lower part. However, an assembly of alternating joints of components of different characteristics is of uncertain strength and, in addition, introduces a further complication in the assembly of a great number of small components, which is difficult to perform satisfactorily using unskilled manpower.

It is thus apparent that there is an unsatisfied need for tubular hollow structures with a flattened base, of high mechanical strength, and whose manufacturing, transportation and installation costs are considerably lower when compared with current techniques.

SUMMARY OF THE INVENTION

The present invention has thus for preferential subject matter a very large cross-section enclosed structure capable, for example, of exceeding 100 $m^2$, consisting of tubular sections placed end to end along a lengthwise axis, each section consisting of an assembly of prefabricated components, each corresponding to a portion of the cross-section of the wall, namely, two side components, at least one substantially planar base component placed on the ground and at least one upper component forming a vault and resting on the upper edges of the side components.

According to an essential characteristic of the invention, each side component is provided at its lowermost end with a stabilizing member having a widened planar bottom permitting the said side components to stand up by themselves, without scaffolding.

According to a particularly advantageous characteristic, at least the lengthwise joints between the upper edges of the side components and the lower edges of the upper components are of corresponding rounded shapes, namely, hollows and projections, providing an articulated bearing member capable of slight pivoting movement under the action of the applied loads.

According to another advantageous characteristic of the invention, the lengthwise joints between the components, namely, the upper and side components of each section, comprise two spaced apart articulated bearing members between which the adjoining ends of the walls of the upper and side components are separated from each other so as to form a free gap into which preformed reinforcements extend transversely from each of the upper and side components, with lengthwise extending anchoring rods associated with the reinforcements, the parts being integrated by sealing mortar cast in the said free gap.

In a first embodiment of the invention, each side component consists of a wall comprising an upper portion curved so as to connect to the upper component, a substantially vertical lower portion, and a stabilizing member consisting of a widened sole-shaped bottom comprising two wings extending horizontally on each side of the said vertical lower portion.

In another embodiment, each side component consists of a curved wall comprising an upper portion with the same radius of curvature as the upper vault component and a lower portion connected tangentially to the planar base component, in a horizontal direction, and the stabilizing members comprise substantially triangular shaped members, outwardly from the lower ends of the side component and having a horizontal planar face, a substantially vertical outer face and a curved inner face closely matching the outer face of the lower portion of the side component. These stabilizing members may be discontinuous and located intermittently along the conduit, each side component of a section being provided with at least one stabilizing member in order to keep it upright after it is installed.

By virtue of the use of the stabilizing members enabling the side components to stand by themselves, the structure according to the invention may be erected rapidly and with little personnel or equipment, even in the case of very large sizes. In point of fact, according to another characteristic of the invention, a base consisting of planar components centered along the longitudinal axis is produced on previously flattened and tamped soil, normally the bottom of a trench, the side components equipped with stabilizing members enabling them to stand by themselves are then placed on each side of the base, and the upper component is thereafter placed on the upper edges of the side components, it then being possible to produce the junctions or joints between the components forming the section.

In another embodiment, usable for construction of canals for circulation of liquids, consisting of tubular sections placed end to end, each section comprises at least one substantially planar base component placed on the ground and two side components placed on both sides of the planar base component, and provided each one at its lowermost end with a stabilizing member having a widened planar bottom permitting the said side components to stand up by themselves, without scaffolding.

The bearing surface of each side component is determined so as to permit to said component to resist at the tilting moment resulting from the liquid pressure in the canal, taking into account the effects of the planar base and of the ground.

It is possible, to reach customer's requirements to prepare molds for the fabrication of components in requested sizes and, often, the upper section of the conduit will have a semi-circular shape, the vault component and the upper sections of the two side components having the same centre of curvature placed in a horizontal plane, a certain distance above the planar base.

By that way, an optimum passage section is obtained. However, other shapes may be called for in certain cases, particularly in order to take special layout conditions into account.

It has now been found that the constitutive characteristics of the prefabricated components previously described made it possible, with a relatively small number of components, to realize conduits of various dimensions permitting very flexible adaptation to layout conditions and to the required passage sections.

According to a supplementary characteristic of the invention, dimensional characteristics are defined in advance for at least two ranges of components, namely one range of side components comprising at least two homothetic types of components of different heights, and one range of vault components comprising at least two homothetic types of vault components of different widths, and for the purpose of constructing a tubular structure of a given cross-section and given space requirement types of side and vault components are selected from each range in such a manner that their height and width respectively will enable their assembly to approximate as closely as possible to the required passage section, while meeting the stated space requirement.

The dimensions of the components having thus been defined, it is possible to produce in advance at least two ranges of components of at least two types, and the components of the selected types are delivered to the site for the purpose of constructing the conduit by assembly of these components.

In order to be able to meet orders with ease, at least two ranges of prefabrication moulds, corresponding to the dimensional characteristics defined, are normally available. It is therefore also possible to install near the site at least two moulds for on-site production of each of the two types of components selected respectively for the sides and the vault, and the components of the two types are produced in accordance with requirements in proportion as the work proceeds.

The planar base elements can be composed of concrete poured on the site before or after the side components are laid, but it is also possible to produce in advance a supplementary range of planar components, each type covering a width corresponding to that of one type of vault component, and the conduit is formed by assembling base components and vault components of corresponding width, together with side components which may optionally be of a different type.

According to another advantageous characteristic of the invention, for at least one kind of components, of the vault, side or base types respectively, at least two ranges of components of different shapes are defined, retaining for the side and vault components the same inclination of the support planes, each range comprising at least two types of homothetic components.

In this case, for the construction of a tubular structure, it is possible for side components selected from two ranges of different shapes to be disposed one on each side of the median plane.

In particular, for the production of multi-section conduits, it is possible to have available two ranges of side components, that is to say components having an incurved wall connecting tangentially at their top ends to the vault components and at their bottom ends to the base components, and components having a straight vertical wall and provided with longitudinal supporting members forming two symmetrically inclined support planes one on each side of their median plane, and conduits disposed side by side are formed by associating vault and base components with side components having an incurved wall and side components having a straight wall, with the desired height, the components having an incurved wall being placed on the outermost sides, while the components having straight walls form intermediate piers between the conduits lying side by side.

The invention thus offers the advantage of the possibility of erecting structures even of very large size using a small number of components, generally of three types, which may be readily stacked on each other for transportation and which may be rapidly installed by a smaller number of people.

Another advantage of the invention results from the noncircular contour of the structure, and in view of the disadvantages of conduits of circular contour, above-mentioned.

Furthermore, owing to the flattening of the cross-section of the base, the distribution of the stresses produced n the ground underneath is considerably improved and its movements may be greatly reduced. Another advantage of the cross-sectional shapes or profiles of this kind is a reduced height for a given flow cross-section, which results in reduced excavation costs (digging, shielding and retaining subterranean water, and the like). Furthermore, when the consistency of the supporting ground requires it (aquifers, in particular), the conduit may incorporate ballast in the form of metal or concrete masses which are suitably bolted under the bottom components of the conduit. The weight of the ballast is naturally calculated as a function of the actual properties of the individual site and each of the ballast members may also be prefabricated. The conduit also may be anchored to the ground using the same bolting procedure, which is made easier to perform from within because of the flattened shape of the bottom components.

According to another advantageous characteristic of the invention, the various components may be of variable thicknesses according to the results of the calculation of stresses. They may also be made of different materials, provided, nevertheless, that, where applicable, necessary precautions will have been taken to prevent corrosion due to the electrochemical couple effect.

In the most widely used embodiment, the structural components will be made of reinforced concrete, prestressed or otherwise, but other materials may also be used. Ductile cast irons may be mentioned, in view of their relatively low cost and their ready availability and ease of assembly by welding and/or other means, but other materials may be envisaged either by themselves or in combination, such as steel, aluminum alloys, alloys of other metals and plastics, whether fibre-reinforced or otherwise.

Changes of direction are produced by prefabricated curve or angled components which are specially calculated and adapted to the geometry required.

The manufacture of the conduit according to the invention, that is, of partially cylindrical components corresponding to only a part of the contour or cross-section but which, on the other hand, may be of great length, presents specific problems at the time of assembly. The problems have been solved by the following assembly procedure which is therefore closely linked to the main features of the invention. According to this procedure, the components are initially assembled by being connected both lengthwise and transversely by means which allow a limited relative movement of adjacent components, and a flexible sealing member is inserted between them and, after the surrounding ground and the entire conduit have been stabilized, rigid assembly of the components is then performed. The initial assembly of the components to each other is preferably performed by means of bolts passed through corresponding apertures in at least one of the components.

Nevertheless, other methods of assembling the components may be found more advantageous, especially for joints where high stresses require large wall thicknesses. In such cases, one or more of the following methods are preferred.

For making the lengthwise connection and, where appropriate, the transverse connection of conduit components, recesses and projections are provided in corresponding edge regions of adjacent components, which are of force-fitting or matching shape, for providing the required transverse and lengthwise connections.

To provide lengthwise joints, a rib may be formed on each of the edges of two components to be joined and the ribs clamped together at intervals by clamping means. The clamping means may be rigid or resilient U-shaped members which are fastened by rigid or resilient shims force-fitted between the inner surface of the clamping means and the flank of the corresponding rib, or by resilient deformation of the clamps themselves.

Gaskets or seals whose cross-section is shaped so as to match the edges of the transverse and lengthwise joints are inserted between the edges, and their leakproof sealing action is ensured by means of the clamps, or by means of collars, hoops, prestressing cables or the like.

Where the components are made of weldable or bondable materials, the lengthwise and transverse joints may be produced by additional quantities of appropriate welding or bonding material.

In some cases, especially when dangerous fluids are to be conveyed or stored, or for the construction of bomb shelters, perfect sealing is required even in the event of ground movements or of a nearby explosion. If the components are made of concrete or a material which may crack or lose its leakproofing in some other way, a leakproof lining or cladding is advantageously provided, and this may or may not be fastened to the structural components.

In some cases the lining may form a part of permanent shuttering for the structural components. If the lining is made of metal or nonmetallic sheet or other weldable or bondable material, flat members of the type indicated above may be welded or bonded to the joints of this lining, or the parts of the lining between the flat members may be welded or bonded directly thereto at the joints.

If the structure, conduit or shelter is made of concrete components, then crush resistance is provided by the concrete components, and the inner lining may be of metal or nonmetallic sheet or of plastic, welded, bonded or applied as a coating, providing absolute leakproof sealing against radioactive or other contamination or infiltration, even when the structure has been distorted by movements due to the ground or to an explosion.

The examples which follow relate essentially to conduits of large cross-sectional area, but it will be readily understood that they can be applied equally to silos, shelters or other similar structures.

In the case of a prefabricated bomb shelter, longitudinal wall components, which may also be used for conduits of large cross-section, are positioned and the shelter is closed at its ends by means of plane or convex transverse walls. According to the invention, the shelter will have a substantially flat bottom, and the base and side components are provided with stabilizing side members, so as to prevent the shelter from tilting about its longitudinal axis. A leakproof inner lining is advantageously provided, especially if the shelter is made of concrete.

The shelter may be installed very quickly, since it is made of separate components which may be easily transported for assembly at the desired site. It may be installed in an excavation which is then filled in or, in certain circumstances, it may simply be placed on the ground. It will be noted that the flattened dwelling configuration provides enhanced blast resistance when compared with masonry shelters of cylindrical or parallelepipedal shape.

DESCRIPTION OF THE DRAWINGS

The invention will now be described in greater detail with the aid of embodiments illustrated in the drawings, which do not imply any limitation.

DESCRIPTION OF SOME PREFERRED EMBODIMENTS

Figure 1:
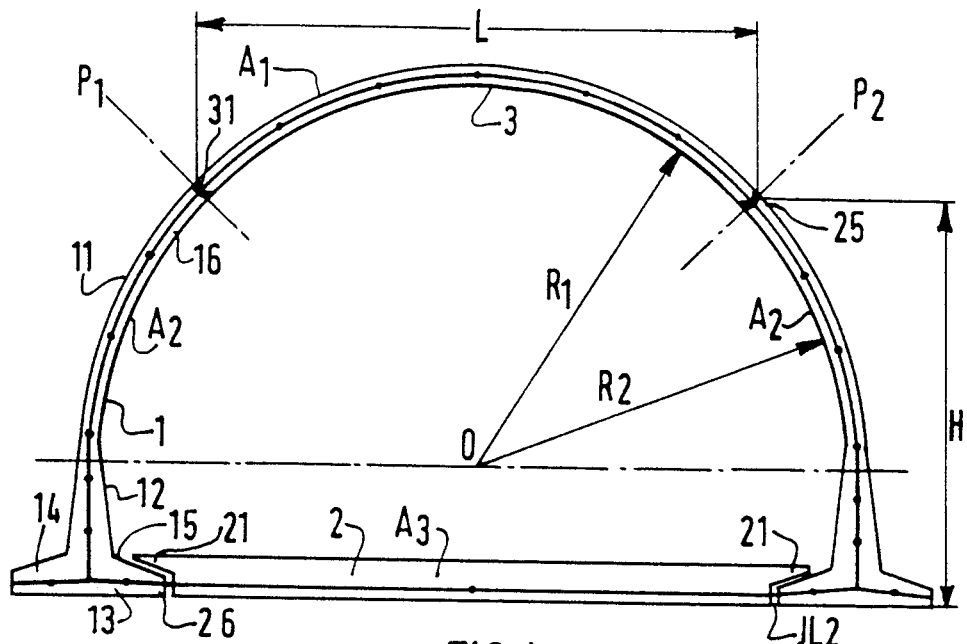
FIG. 1 shows diagrammatically, in cross-section, a first embodiment of a structure according to the invention.

Generally, as can be seen in FIG. 1, the covered structure consists of components of three types, namely a curved vault component A1 in the form of a circular sector covering substantially one quadrant, two side components A2 and a base or floor component A3. All these components are preferably made of reinforced concrete.

Each side component A2 consists of a wall 1 comprising a curved upper portion 11 which has a radius ($R_2$) of curvature substantially equal to that ($R_1$) of the component A1, so as to connect tangentially to the latter, and a substantially vertical rectilinear lower portion 12 which rests on a widened sole-shaped bottom member 13 comprising two wings 14 and 15 extending on each side of the wall 12, perpendicularly to the latter. The width of the sole 13 is determined, the distribution of the masses being taken into account, so that the component A2 can stand up by itself, when placed on the sole 13, without the need for scaffolding.

The rectilinear portion 12 advantageously may be widened at the base to increase the rigidity of the component A2.

Depending on the size, the base member A3 may consist of one or several elements. It also may be cast in situ.

The component A1 consists of a curved wall 3 in the shape of a circular sector, which rests with its lower edges 31 on the upper edges 32 of the two components A2 which support it.

Figure 3:
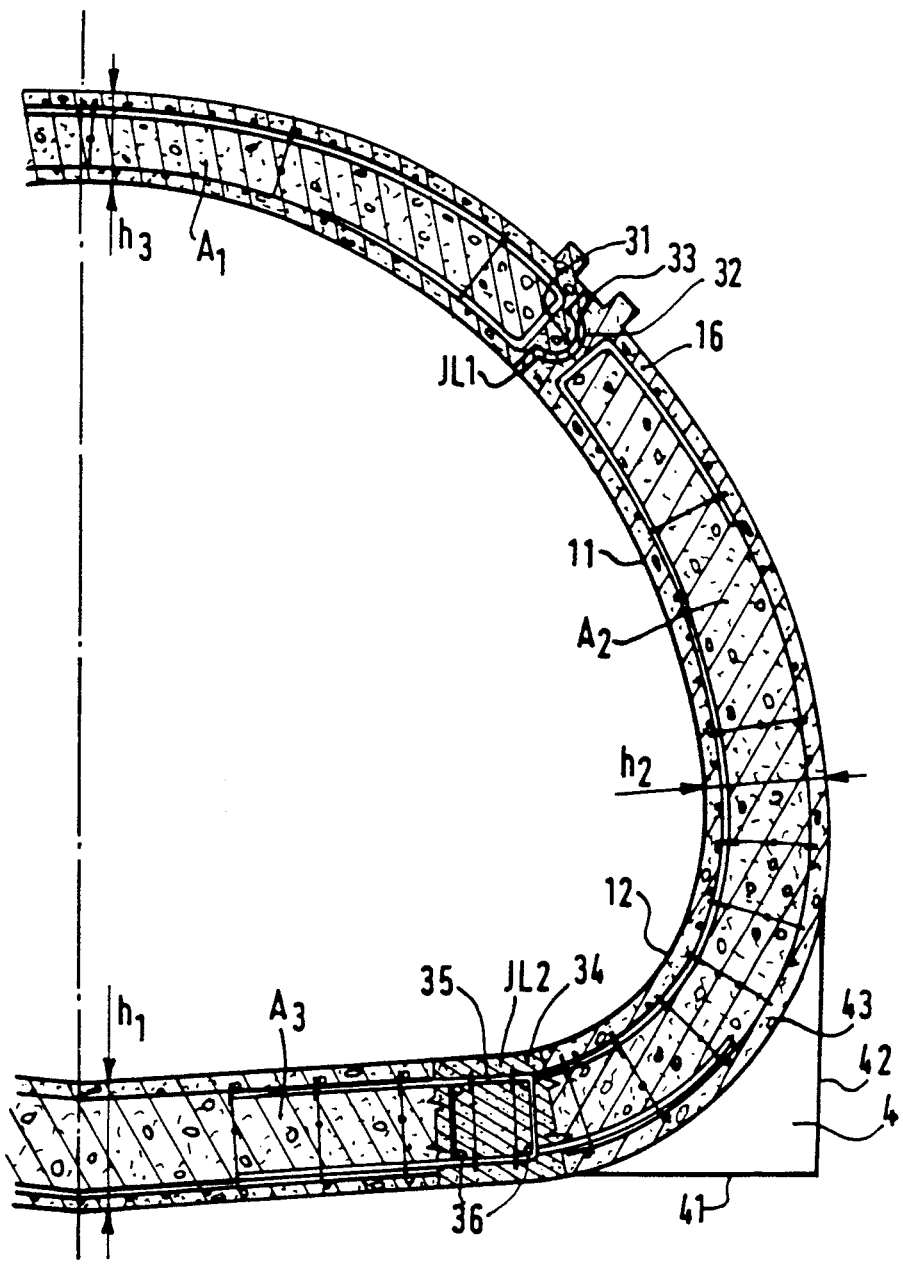
FIG. 3 is a view of a detail of the embodiment of FIG. 2.

As is shown in FIG. 3, the edges 31, 32 of the components A1 and A2, which rest on each other, preferably have corresponding rounded shapes, namely recesses on the upper edge 32 of the component A2 and projections on the lower edge 31 of the component A1 so as to provide an articulated support with the capability of slight pivoting movement under the action of the applied loads.

Thus, in order to produce a structure of the type in FIG. 1, the two components A2 are first placed, at the required distances apart, on the flattened and tamped bottom of an excavation, following by the component A3 and, lastly, the vault component A1 resting on the two components A2. The latter are normally calculated so that they can support the component A1 without any risk of falling over but, in order to increase the stability, it is also possible to begin the backfilling on the outer sides of the two components A2 after the latter have been positioned, so that the external wings 14 of the two components hold the latter by a spade foot effect.

If the cross-section of the structure is very large, it may become necessary to produce components of sizes which are too large to enable them to be readily transported. In this case, the vault component A1 may consist of two components bearing on each other at the crown. The side components A2 are then subjected to a side thrust which may be taken up either by performing the backfilling over a specified height on each side of the two side components A2, or by connecting the latter temporarily, for example, by means of cables which resist the separation of their components.

In the embodiments shown, the base component consists of a slab 2 provided on its opposite side edges with extensions 21 shaped as short consoles which partly overlap the wings 15 of the two side components A2, the facing portions being of matching shapes so as to form a dry joint.

Thus, the planar base 2, bearing on the inner wing 15 of each side component, helps for the stability of the latter, opposing to its outer tilting under thrusts, for example when the canal is used for circulation of liquids. This stabilization effect depends on the weight of the prefabricated component 2 and eventually the load supported by the planar base 2, i.e. the carried liquid.

In the case of a burried conduit, it can be useful, according to a known technique, to secure the base by means of strings clamped in the ground to resist to vertical pressures due for example to the subsoil water. This clamping of the planar base would help also for the stability of side components A2.

Figure 1A:
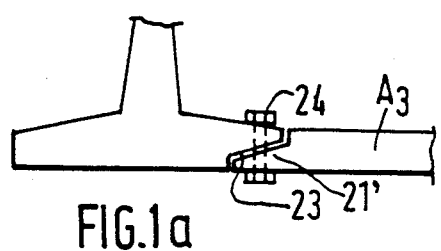
FIG. 1a is a view of a variation of a detail of the embodiment of FIG. 1.

Though, it may be also used a feature shown on FIG. 1a, for example if the planar base A3 has to be firstly placed or concreted in situ. In this case, the inner wings 15 of the side components can cover the lateral edges 21' of the planar base A3 which can be thus maintained by the applied weight on vault component 3 and transmitted to side components A2. This feature can sometimes permit to avoid the use of clamping strings.

Of course, the tightness gasket 23 can be inserted between the faces in front of the console-shaped projections 21 and the wing 15 of the side component, and these two members can be connected by fastening bolts 24 as shown on FIG. 1a.

In another hand, when the structure is partially enclosed, the weight of the grounds overlapping the outer wing 14 opposes to the reversing to the inside of the side component A1 by a spade-effet.

In certain cases, the planar base A3 can be suppressed if it is not particularly useful, for example for the tightness of the canal. The loads supported by the vault, due to the own weight of the structure and the thrusts of the ground, are directly transmitted to the soil through the soles 13, the width of which being calculated with respect to the resistance of the soil for supporting said thrustes.

The construction just described can be used equally well to produce closed buildings, such as shelters or passageways for fluids, people or vehicles.

It will be noted that, in the case of a building placed on the ground, the stabilizing members increase the resistance to forces which tend to overturn the structure, and this is advantageous in the case of a nuclear or other shelter which would be placed on the ground and exposed to blast effects.

Figure 2:
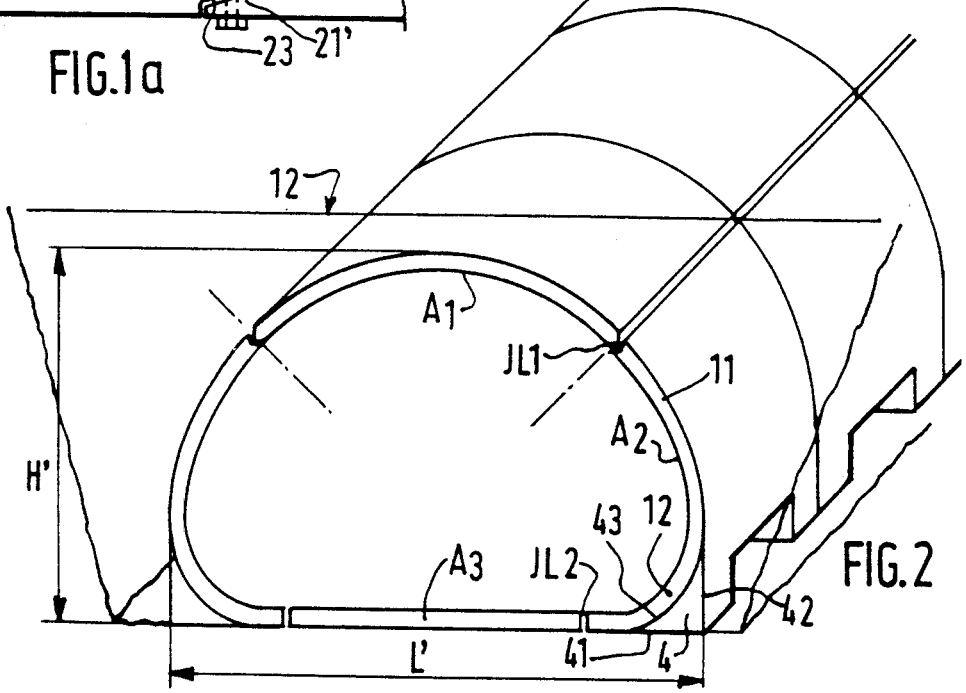
FIG. 2 is a diagrammatic perspective view of a second embodiment of the structure.

The embodiment shown in FIGS. 2 and 3, which illustrate a closed and rounded internal section, is more suitable for conveying fluids. In this case, each side component A2 consists of a curved wall whose lower portion 12 normally has a radius of curvature which is shorter than that of the upper portion 11, so as to join tangentially onto the base A3.

In a particularly advantageous manner, the vault component A1 and the upper portions 11 of the side components A2 are in the shape of arcs of a circle of the same radius and with the same center 0 placed in the longitudinal plane of symmetry of the conduit, while the lower portions 12 of the side components A2 are centered on two points $O_1$ and $O_2$, at symmetrical distances apart on each side of the point O.

The stabilization of the side components A2 is provided by the stabilizing members 4 placed at the bottom and on the outer sides of the component A2; these stabilizing members 4 are of substantially triangular shape comprising a horizontal plane face 41, a substantially vertical outer face 42 and a curved inner face 43 closely matching the outer face of the lower portion 12 of the side component.

FIG. 3 shows in greater detail the components which form the structure and which, in most cases, will be made of reinforced concrete.

As already indicated, the upper edge 32 of the component A2 and the lower edge 31 of the vault component A1 are rounded and interengage to form an articulated bearing permitting slight pivoting movements, at least during the stage of positioning of the components and backfilling.

To ensure that the lengthwise joints JL1 are leakproof, provision is made for the interposition of a coating, mastic, gasket or other sealing agent, made of rubber in particular, between the corresponding surfaces 31 and 32, as indicated at 33 in FIG. 3, these joints being designed also to ensure leakproof sealing under pressure.

On the other hand, the joint JL2 between the lower edge of the components A2 and the base component A3 is preferably made of reinforced concrete. During positioning, the opposite faces of the two components are left with a gap 34 between them into which project preformed reinforcements 35, which are embedded along with anchoring rods 36 in a sealing mortar which is cast in the gap 34 in order to produce the joint. This joint locking may be carried out either when the conduit is being finished, or before the vault component A1 is placed in position, so as to integrate the side components with the base A3 and thus to increase their stability.

Figure 4:
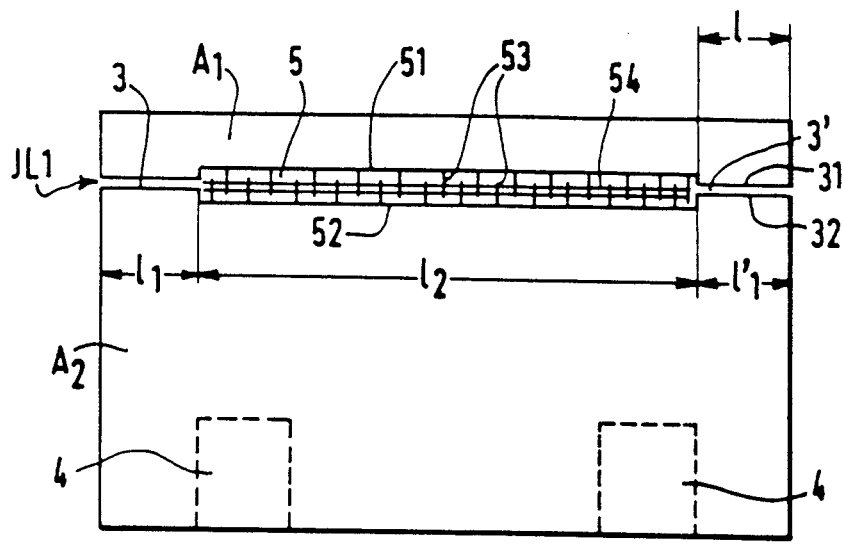
FIG. 4 is a side view of a structural section in another embodiment.
Figure 5:
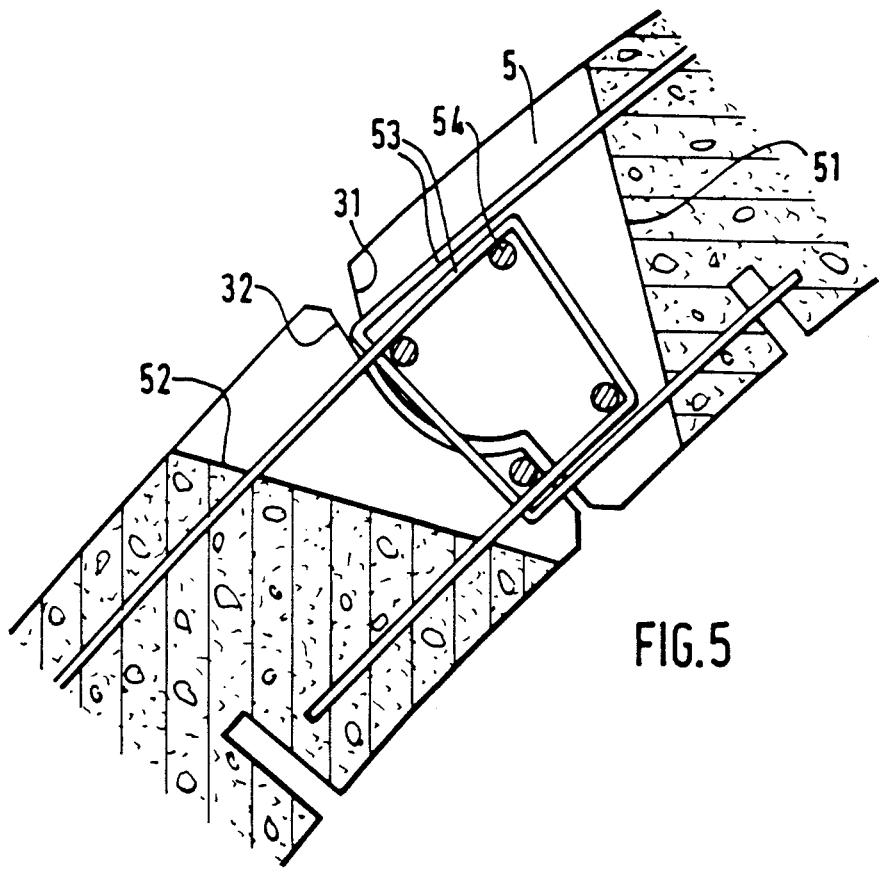
FIG. 5 is a view of a detail sectioned along AA of FIG. 4.

In a more highly developed embodiment, illustrated in FIGS. 4 and 5, the joint JL1 between the vault component A1 and each side component A2 is of mixed construction and comprises two articulated bearing members 3 and 3' separated from each other and preferably placed at the opposite ends of the components A1 and A2 forming each section. The articulated bearing members 3 and 3' are made in the manner previously described, but extend only over a shorter length ($L_1$, $L'_1$). Between the articulated bearing members 3 and 3', that is to say, over the remaining length $L_2$ of the section, the ends 51, 52 of the walls of the components $A_1$ and $A_2$ are separated from each other by a predetermined distance, on each side of the plane of the joint JL1, so as to provide a free gap 5 into which preformed reinforcements 53 extend transversely from each of the two components.

After the upper component A1 has been positioned on the side components A2, lengthwise anchoring rods 54 are passed through the preformed reinforcements 53 and the assembly locked by a sealing mortar cast in the gap 5. Thus, the vault components $A_1$ can be placed on the side components $A_2$ first, and then backfilling may be performed, the lengths (L, L') of the articulated supports 3, 3' being merely sufficient to support the weight of the upper component $A_1$ and the backfill. After stabilization of the ground, keying of the joint points is then carried out by pouring mortar into the gaps 5. The advantage of the articulated support, which makes the components easier to position, and of the sealed joint, which ensures the definitive integration of the structure, is thus combined.

In some applications, it is possible, within the scope of the invention, to provide a conduit of composite structure, that is, with some components being made of a first material, such as reinforced concrete, in a first part of the conduit, for example, the base between the lengthwise joints JL2, and with other components being made of a second material, for example, a metal or a fiber-reinforced or other plastic, in the rest of the conduit. Such a composite structure may be recommended for a water supply structure in an open ditch, that is, without high loads on top of the conduit, in a remote area where it is advantageous to make the lower part of cast reinforced concrete at the construction site, and to have the upper part made of thin components prefabricated in a factory and transported to the construction site.

In FIG. 3 it can be seen that the thickness ($h_1$, $h_2$) in the regions corresponding to the highest stresses, respectively in the middle of the base and along the sides, is about 50% greater than the thickness $h_3$ at the top. The joints JL1, JL2 between components have been placed in the "nodal" regions.

It should be noted that the above-mentioned assembly arrangements are used for installing the conduit and do not, by themselves, necessarily withstand the hydrostatic pressure in the case of a pressurized conduit, since, in this case, the hydrostatic pressure is partly compensated by the thrust of the backfill.

To improve the union on the components of a conduit, shelter or the like, and to facilitate sealing, nonstrapping cables, prestressing cables or bars which connect together adjoining components positioned end to end, may be provided. Each of these cables or bars may connect at least two consecutive components, for example, a component may be connected to the following component by a set of cables or bars and to the preceding component by another set of cables or bars, the prestressing being thus capable of being applied progressively during the installation process. Each prestressing cable or bar may also connect three or more consecutive components.

Until now, were described enclosed structures for construction of tunnels or closed buildings. Though, the invention can also be advantageously applicable to the construction of canals for water circulation.

Figure 6:
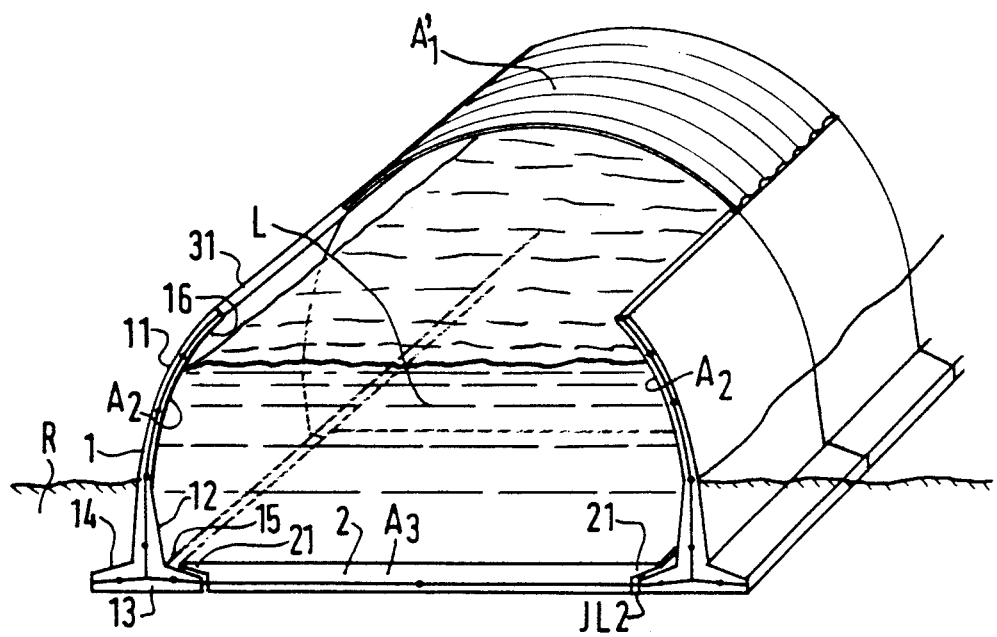
FIG. 6 shows in a perspective view the construction of a canal according to the invention.

By the fact, as it is represented on FIG. 6 as an example, it is possible by using prefabricated components according to the invention, to realize a canal with a very large cross-section, formed by longitudinal sections placed end to end and each comprising one planar base A3 realizing a flat bottom, interposed between two side components A2, which may be constructed according to anyone of the previously described embodiments, each side component being provided at its lower end with a stabilizing member having a widened planar bottom permitting the said side components to stand up by themselves on the soil.

For example, in the embodiment represented in FIG. 6, each side component presents a widened sole-shaped bottom 13, the width of which being determined so that, when laying the side components A2, each of them can stand up by itself without scaffolding. The sole-shaped bottom 13 comprises two wings 14 and 15 extending horizontally on both sides.

As it is shown on FIG. 6, it is possible to choose one of the features represented in FIG. 1 and 1a and above described.

So, the planar base 2 can be provided on its lateral edges with projections 21 partially recovering the inner wings 15 of the side component A1, so as to oppose to the tilting of said side components A2 under the pressure of the liquid L circulating in the canal. Of course, a tightness gasket is inserted between the wings 15 and the edges 21 of the planar base but, as above indicated, it is not necessary to realize a real concreted keying up of the two components to ensure the stabilization of the structure.

Moreover, it will be noted that the inner curved shape of side components A2 helps also for the stability by reducing the horizontal thrust on each side component A2 under the liquid pressure.

The sizes of the different components are determined to ensure the requested cross section of water way and the curvature of the side components A2 can be determined for permitting to better resist to pressures, the width of the wing 15 of the bottom 13 being calculated so that component A2 be stable when laying, i.e. without liquid. Of course, it is not prohibited to foreseen by security the use of light stabilization means bearing on the planar base to avoid tilting of the side component during assembling. Furthermore, if the canal is slightly enclosed, the outer wing 14 extending under a backfilling R also helps to the component stability by "Spade effect".

It will be noted that due to the particular shape of the canal obtained by using such inner curved sidecomponents, for an equal cross-section of flow, the free surface of the liquid and therefore, the risks of evaporation will be reduced, which is important for arid countries. Moreover, it is always possible to cover the structure by an opaque vault-shape component A'1, bearing on upper edges 31 of side components A2. This vault component would not take part for the resistance of the structure and thus could be very slight and made of, for example, synthetic material able to ensure, moreover, a certain insulation.

In the examples described until now, the structure has always be realized semi-circular, the vault component A1 and the upper parts 11 of side components A2 being curved in an arc of circle having radius, respectively $R_1$ and $R_2$ which are equal, as shown in FIG. 1.

Moreover, the support planes P1+P2 at the edges 31 of the components are generally inclined at 45° so that, in that preferential embodiment, the height H (FIG. 1) of the side components be approximately equal to the radii of curvature $R_1$ and $R_2$ of the vault components $A_1$ and side components $A_2$ and the width L f the vault components A1 be equal to $H\sqrt{2}$.

In this embodiment also, the upper edges 25 of the side components 2 are disposed substantially vertically in line with joints 26 between the lower edges of the side components and the edges of planar base components A3, the latter having thus also a width substantially equal to $H\sqrt{2}$.

Such basic profile will be generally taken up because it allows, for a minimum perimeter, and consequently for a minimum weight of the transported components, to obtain an optimum sectional area of passage inside the conduit.

For each passage section it is therefore necessary to make vault components and side components having widths L and heights H adapted to the section required.

Nevertheless, if the components of the same type are given shapes deduced homothetically from one another, the inclination of the support planes P1 and P2 will be retained.

It was therefore thought that it would be possible to associate with one another side components and vault components whose respective heights and widths do not correspond to the proportions of the basic profile, in order to achieve different profiles. In this way it is possible to meet requirements by producing in advance a plurality of ranges of respective side and vault components and selecting, from each range, the types of components which make it possible to obtain with the closest possible approximation the desired passage section, by adapting it to the space conditions dictated by the site. For a certain passage section the optimum profile shown in FIG. 2 occupies in fact an overall width L' and a height H' which may be incompatible with the possibility of producing the excavation 11 and with the level of the traffic highway 12. The process according to the invention enables this problem to be solved by producing, if needed, conduits having a flattened or raised section permitting accommodation within a given profile while retaining the desired passage section.

Figure 7:
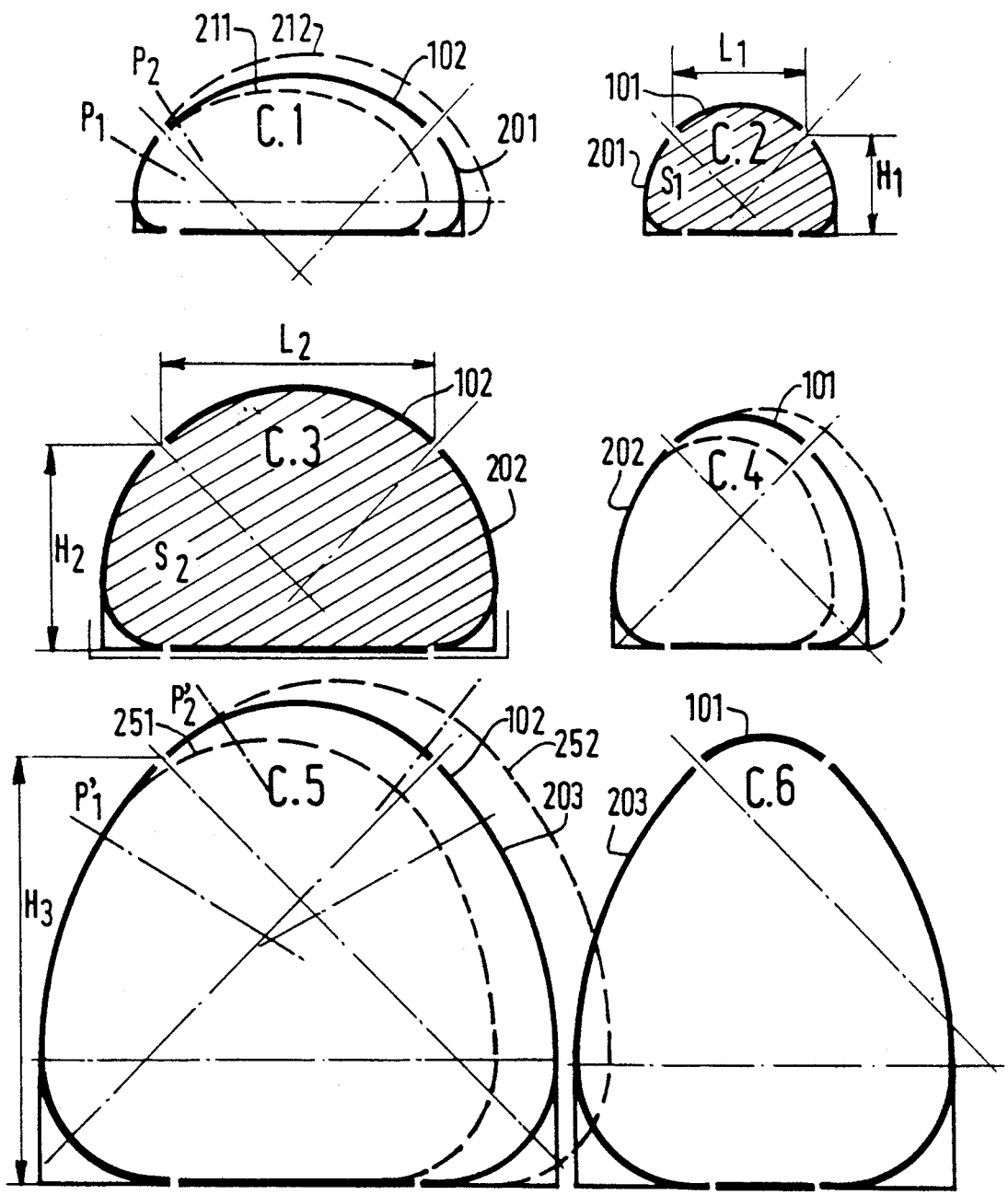
FIG. 7 shows various possible embodiments with different ranges of prefabricated components.

FIG. 7 shows by way of example different forms of construction which are possible through the combination of different types of components.

FIGS. C.2 and C.3 correspond, for example, to the basic profile for two different passage sections S1 and S2 obtained with side components and vault components having respectively a height H1 and a width L1 for the passage section S1, and a height H2 and a width L2 for the passage section S2.

By associating vault components of the width L2 with side components of the height H1, the flattened profile C.1 is obtained, which has substantially the same base width as the profile C.3, but with a smaller height.

On the other hand, by associating side components of the height H2 with vault components of the width L1, the raised profile C.4 is obtained.

It has been seen above that the base components 1 have a width slightly smaller than that of the vault components 3, in order to form the concreted joints 15. For each conduit profile it is therefore possible to associate base components with vault components and to select them from corresponding types in such a manner as to obtain the desired passage section. However, for the construction of a conduit it would also be possible to concrete the base in place either before or after the side components 2 have been placed in position.

It is therefore possible to define in advance a plurality of basic profiles similar to the profiles C.2 and C.3 in FIG. 7, making it possible to cover all passage sections which can be achieved, for example from 3 to 100 square meters or more, and to determine for each basic profile the constitutive characteristics, inside profile, thickness, reinforcement etc. of the side components, of the vault components, and optionally of the base components. A plurality of ranges of components of each type will then be produced in advance, each range comprising a plurality of types of components. For example, in the case of FIG. 7, the range of side components comprises three types of components of the heights H1, H2, H3, and the range of vault components comprises two types of components of the widths L1 and L2, thus making it possible to obtain six different profiles through different associations of the components with one another, the orientation of the support planes always being retained because the shapes of the components are deduced homothetically from one another. However, it is also possible to define within each range a larger number of types of components in order to obtain a wider choice and to meet requirements with greater flexibility.

Furthermore, in the example illustrated the components of each type have homothetic shapes, but it would also be possible to define different shapes for the vault, side or base components, provided that the inclination of the support planes is retained. Thus, it is not absolutely necessary for the vault components to be curved in an arc of a circle, other shapes being conceivable. The same is true of the base components, which, depending on the loads applied to the latter—which in turn depend on the use to which the conduit is put and on the layout conditions, may have a greater or lesser thickness or may include accessories, for example a central gutter.

In the different forms of construction shown in the different figures, the planes of joints between the side components and the vault components are inclined at 45° to the horizontal and therefore together form a right angle. It could however be of interest to modify this inclination so that the planes of the joints form an obtuse or acute angle, in order to obtain still other shapes. A modification of this kind, which in the casting of the components simply requires adjustment of the position and inclination of the panels forming the ends of the moulds, would make it possible to modify the width between supports and their height, and consequently the dimensions of the conduit, without changing moulds and therefore to retain the radius of curvature of the components. As an example, FIG. 7 shows in broken lines the shapes obtained from components having the same radius of curvature by modifying the inclination of the joint planes. In FIG. C.1 the profile 211 is indicated, which corresponds to joint planes P1 forming an obtuse angle, and the profile 212 for joint planes P2 forming an acute angle.

In FIG. C.5 the profiles 251 and 252 are obtained in the same way by varying the inclination of the joint planes P'1, P'2 without changing the radii of curvature of the components. Depending on whether the side components have a radius of curvature larger or smaller than the vault components, a reduction of the inclination of the joint planes makes it possible to reduce or increase the passage section, and vice versa.

It is also possible to vary the shapes of the side or base components and, for example, to use said components having straight wealls of the type described in U.S. Patent Application Ser. No. 887,107 filed on July 2, 1986 by the same inventor.

Figure 8:
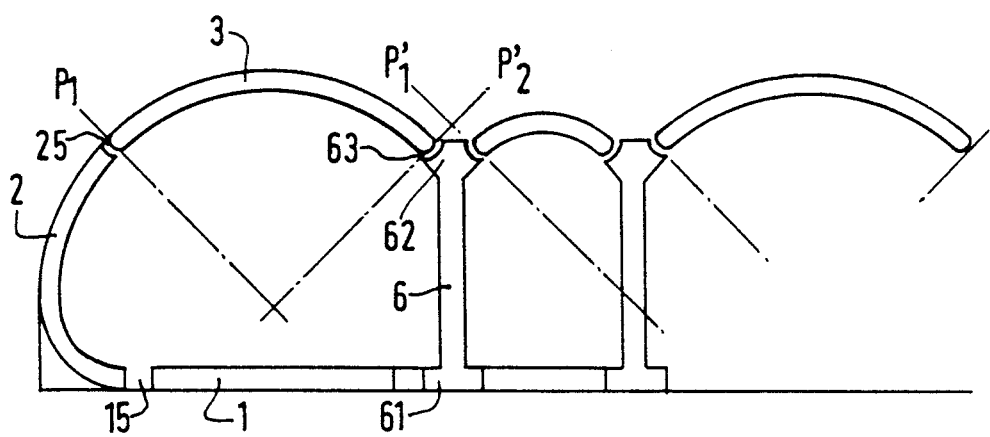
FIG. 8 shows, in cross-section, another embodiment for a conduit constituted by sections of different shapes.

In this case, in fact, the vault components can be associated, as illustrated in FIG. 8, either with incurved side components 2 of the type described above, or with components 6 having a vertical wall and provided at the bottom with a base 61 enabling them to stand up on the ground, and at the top with longitudinal mounting members 62 widened-out in such a manner as to provide, in planes P'1, P'2, articulated supports 63 similar to the supports formed on the edges 25 of the components 2.

This embodiment makes it possible to construct multi-section conduits bounded on the outer sides by incurved side components 2 and, between the different sections, by components 6 having a straight wall and forming intermediate piers.

Within the scope of the present invention it will therefore be possible also to produce a range of components having straight walls and having heights H1, H2, and so on, corresponding to the different types of side components 2 having incurved walls.

In this way, as illustrated simply by way of example in FIG.  , it will also be possible to associate components having vertical walls with vault components of different shapes in order to form, for example, multiple conduits whose juxtaposed sections would have different dimensions.

It can therefore be seen that a very large number of combinations are possible, and that the invention is obviously not restricted solely to the embodiments which have been described above, but includes all variants which are within the scope of the claims.

In particular, the invention has been described for use in cases where the conduit is provided with a flat bottom, but in case of need it would be possible, for example for the purpose of constructing a traffic way in a sewer or a pavement in an underground passage, to use side components of different heights on each side of the vault component, the base component then being constructed to make the connection, giving the base of the conduit the desired shape.

In addition, in order to meet requirements quickly, it is helpful to have available in stock, for example in a regional agency, a fairly large number of components of several types for each range, produced industrially in a factory. However, for the production of the components it is obviously necessary to have available a prefabrication mould for each type. Where required, for example for the construction of a conduit of considerable length requiring the use of a very large numbermof components, it could be preferable simply to deliver, to a point close to the site, the moulds corresponding to the types selected, the components being produced on site in accordance with requirements.

Furthermore, although the process described above is applicable essentially to the construction of conduits of great length by the juxtaposition of sections laid side by side, it could also be applied in a general way to the construction of any structures of tubular shape, either underground or overhead, having one or more waves, for example antinuclear shelters, industrial buildings, dwellings, and so on.

What is claimed is:

1. An enclosed structure of very large cross-section, such as that exceeding 100 m$^2$, comprising tubular sections placed end to end along a longitudinal axis on a flattened bottom provided in an excavation, each of said sections comprising an assembly of prefabricated components of reinforced concrete, each of said components corresponding to a portion of the cross-section of said structure and having correspondingly shaped edges for engaging its neighboring components when each of said components is in said assembly, the radii of curvature of said components being such that each of said components connects tangentially to its neighboring component at the junction of said edges, said edges forming lengthwise joints, each defining respective support planes, said components comprising:
   (a) two side components, each having (1) a substantially vertical wall, (2) an upper edge, and (3) a lower end provided with a portion constituting a stabilizing member having a widened, substantially planar bottom;
   (b) at least one upper component in the shape of a substantially circular sector, said upper component having lower edges engaging corresponding upper edges of said two side components along upper lengthwise joints to form a vault to close said tubular section; the width of the widened, substantially planar bottom of said stabilizing member of each of said side components being of such magnitude that each of said side components can stand upright by itself both when placed on said flattened bottom of said excavation and when said side components support said upper component.

2. An enclosed structure as claimed in claim 1, wherein the upper edges of the side components and the lower edges of the upper components are of corresponding rounded shapes, forming mating hollows and projections, thereby providing articulated bearing members capable of slight pivoting movement under the action of applied loads.

3. An enclosed structure as claimed in claim 2 including lengthwise joints between the upper component and the side components of each section, said joints comprising articulated bearing members at the opposite ends of the upper edges of the side components and the lower edges of the upper component, the edges of the components lying between said articulated bearings being separated from each other so as to form free gaps therebetween, preformed reinforcments extending into said gaps from each of the components, and lengthwise anchoring rods interconnecting said reinforcements, and a sealing mortar cast in the said free gap to enclose and integrate said reinforcements and anchoring rods.

4. An enclosed structure as claimed in claim 1, wherein each side component consists of a wall comprising an upper portion curved so as to connect to the upper component, and a substantially vertical lower portion, and wherein the stabilizing member consists of a widened sole-shaped bottom comprising two wings extending horizontally on each side of the said vertical lower portion.

5. An enclosed structure as claimed in claim 1, wherein each side component consists of a curved wall comprising an upper portion with the same radius of curvature as the upper vault component, and a lower portion connected to the planar base component, and wherein the stabilizing member consists of substantially triangular shaped member placed outwards at the bottom of the side component and comprising a horizontal plane face, a substantially vertical outer face and an inner face closely matching the outer face of the lower portion of the side component.

6. An enclosed structure as claimed in claim 5, wherein, with the structure forming a conduit lying along a lengthwise axis, the stabilizing members are discontinuous and are located intermittently along the conduit, each side component of a section of conduit being provided with at least one stabilizing member.

7. An enclosed structure as claimed in any one of claims 1, 2, 3, 4, 5, and 6 wherein the components are made of concrete.

8. An enclosed structure as claimed in claim 1, which structure is of mixed construction, consisting partly of components made of a first material and partly of components made of a second material.

9. An enclosing structure as claimed in claim 8, wherein the components of the lower portion of the hollow structural cross-section are made of cement and the components of the upper portion are made of metal.

10. An enclosed structure as claimed in claim 5 wherein the stabilizing members are secured by bolting on the inside.

11. An elongated structure according to claim 1, wherein each of said tubular sections further comprises a planar base component which is placed or cast in situ on the ground between said two side components, said base component having two lateral edges and the lower part of each side component forming an inner wing, said lateral edges and said inner wings being respectively connected along lower lengthwise joints.

12. An elongated structure according to claim 11, wherein said lateral edges of said base component are each provided with an extension shaped as a short console and at least partly overlapping said inner wing of said side component corresponding thereto, the facing portions of said short console and said inner wing being of watching shapes and forming said lower lengthwise joints.

13. An elongated structure according to claim 11, wherein said inner wing provided on said lower portion of each said side component is provided with an extension shaped as a short console and at least partly overlapping the corresponding lateral edge of said base component, the facing portions of said short consule and said lateral edge being of watching shapes and forming said lower lengthwise joints.

14. An elongated structure as claimed in one of claims 12 or 13, further comprising a tightness gasket inserted between the corresponding faces in front of said inner wings of said side components and of said lateral edges of said base components.

15. An elongated structure according to claim 11 wherein said lower lengthwise joints are made of reinforced concrete comprising a sealing mortar cast in a gap between opposite faces of said side and base components, said mortar embedding reinforcements extending transversely in said gap from said components and associated with anchoring rods.

16. An elongated structure according to claim 11, wherein said upper lengthwise joints are provided along joint planes which are inclined at about 45° to the horizontal and said joint planes intersecting to form a substantially right angle.

17. An elongated structure according to claim 16 wherein said structure has a semi-circular shape, said upper component and the upper portion of said side components being curved in an arc having an equal radius.

18. An elongated structure according to claim 17, wherein the height of each said side component is approximately equal to the radius of curvature of said upper component.

19. An elongated structure according to claim 17, wherein the upper edge of each of said side components is disposed substantially vertically in line with its lower lengthwise joint.

20. An elongated structure according to claim 18, wherein the width of said upper component is approximately equal to said heighth of each said side component.

21. An elongated structure of very large cross-section capable of exceeding 100 sqm for construction of canals for circulation of liquids, consisting of longitudinal sections placed end to end along a lengthwise axis, each section consisting of an assembly of prefabricated components, each of said prefabricated components corresponding to a portion of the cross-section of the longitudinal section, namely, at least one substantially planar base component placed on the ground and two side components placed on both sides of the planar base, and each side component being provided at its lowermost end with a stabilizing member having a widened planar bottom to allow said side components to stand by themselves, and wherein the bearing surface of each side component is determined so as to permit said component to resist the tilting moment resulting from liquid pressure in the canal, taking into account the effects of the planar base and the soil.

22. A method for producing an enclosed structure of very large cross-section, such as that exceeding one hundred m.$^2$, comprising tubular sections placed end to end along a lengthwise axis, each section comprising an assembly of prefabricated components, each said component corresponding to a portion of the cross-section of said tubular section, said method comprising the following steps:
   (a) preparing an excavation with a flattened and tamped bottom;
   (b) preparing, for each said tubular section, at least three components comprising two side components and at least one upper component, said two side components each having a substantially vertical wall having an upper edge and having a lower end provided with a stabilizing member having a widened horizontal planar bottom, the width of said horizontal planar bottom of said stabilizing member being of such magnitude that each said side component can stand upright by itself both when placed on said flattened bottom of said excavation and when said side components support said upper component, said at least one upper component being in the shape of a circular sector having a radius of curvature determined for connecting tangentially with said side components;
   (c) first placing said two side components on said flattened bottom of said excavation and at a distance apart whereby said two side components may engage and support said at least one upper component;
   (d) placing said upper component such that its lateral edges engage said upper edges of said two side components to form lengthwise joints.

23. Method for producing an enclosed structure according to claim 22 further comprising the step of placing a prefabricated base component on said flattened bottom of said excavation between said two side components and connecting said base component with the lower internal edges of said two side components to form lower longitudinal joints.

24. Method for the production of tubular structures of various dimensions by longitudinal juxtaposition of sections, each of said sections having a cylindrical cross-section, flattened at its base and symmetrical in relation to a median plane, each of said sections comprising four components: a planar base component laid flat on the ground, two side components placed one on each lateral side of said base component, and an arched vault component whose lateral edges each engage respectively the upper edges of the two said side components along longitudinal joints which define two support planes inclined symmetrically on either side of said median plane respectively, said process comprising the following steps:
   (a) defining the dimensional characteristics of at least two ranges of components, a first range of said components comprising at least two homothetic types of side components having different heights and a second range of vault components comprising at least two homothetic types of vault components having different widths;
   (b) producing a plurality of components of said at least two types for each of said at least two ranges of components;
   (c) selecting from each said range the required types, respectively, of said side components and of said vault components having, for the purpose of constructing a structure of given cross-section and given space, respectively, the height and the width so as to permit, after assembly of said sections, said sections to have about said given cross-section while enclosing said given space;
   (d) associating said side and vault components of each said type so selected for producing at least two sections of said tubular structure.

25. Method for the production of tubular structures according to claim 24, further comprising the additional steps of:
   (e) maintaining in stock a large number of components of at least two types for each of said at least two ranges of components;
   (f) delivering to the site of construction of said tubular structure, side and vault components of said types so selected for constructing the structure by assembling said components.

26. Method for the production of tubular structures according to claim 24, further comprising the additional steps of:
   (e) obtaining prefabrication molds, respectively for the production of said at least two ranges of said side components and said vault components, said prefabrication molds being adjustable with regard to both the height and width of said components;

(f) installing near the site of construction of said tubular structure at least two said prefabrication molds, each said mold adjusted for the production, respectively, of said side components having a height so selected and of said vault components having a width so selected;

(g) producing on said site of construction said side and vault components of said selected height and said selected width, respectively.

27. Method for the production of tubular structures according to claim 24, further comprising the additional step of:

(e) Defining the dimensional characteristics of a supplemental range of substantially planar base components comprising at least two homothetic types having different widths, said widths corresponding to that of said at least two types of vault components.

28. Method for the production of tubular structures according to one of claims 24 or 27, wherein two side components selected from said at least two types and having different heights are placed on either side of the longitudinal axis of said tubular structure.

29. Method for the production of tubular structures according to one of claims 24 or 27, wherein said side components and said vault components are cast in molds, said method comprising the steps of modifying the lengths and the inclination of the longitudinal joints of said components so cast by adjustment of panels forming the ends of said molds in a manner such that the planes of said joints may form an acute angle to enlarge the resulting passage section or an obtuse angle to reduce the resulting passage section, without changing the radius of curvature of said components.

30. Method for the production of tubular structures according to one of claims 24, 25 and 26, wherein the planar base components are composed of concrete poured on site before or after the side components have been laid in place.

31. Prefabricated components for the production, by the process according to any one of the claims 24 to 27, of tubular structures of various dimensions, distributed into a plurality of ranges, respectively side components, vault components, and base components each range comprising a plurality of types of components and respectively of different heights and widths.

* * * * *